C. F. ECKART.
MULSH AND METHOD OF MAKING THE SAME.
APPLICATION FILED DEC. 2, 1919.

1,396,269. Patented Nov. 8, 1921.

Inventor:
Chas. F. Eckart,
by Chas. J. O'Neill,
atty.

UNITED STATES PATENT OFFICE.

CHARLES F. ECKART, OF OLAA, TERRITORY OF HAWAII.

MULSH AND METHOD OF MAKING THE SAME.

1,396,269.   Specification of Letters Patent.   Patented Nov. 8, 1921.

Application filed December 2, 1919. Serial No. 341,971.

*To all whom it may concern:*

Be it known that I, CHARLES F. ECKART, a citizen of the United States, residing at Olaa, Territory of Hawaii, have invented certain new and useful Improvements in Mulsh and Methods of Making the Same; and I do hereby declare the following to be a full, clear, and exact description of the invention, such as will enable others skilled in the art to which it appertains to make and use the same.

This invention relates to a mulsh and to the method of making the same.

It has been proposed to facilitate and enhance the growth of plants by applying a mulsh to the ground before the plant seeds or stock are set in the ground, and after a period sufficient to insure the germination of the weed seeds and the extermination of the weeds has elapsed, to produce planting openings in the mulsh by incising the mulsh to form flaps which are subsequently bent to various degrees with relation to the body of the mulsh to regulate the conditions affecting the soil and the plant which is made to grow therein.

The mulsh of the present invention is so constructed that after the planting openings have been formed, the size of the openings will be automatically regulated and the soil within the planting areas maintained in the proper condition to facilitate the growth of the plants. This automatic regulation of the size of the planting openings is caused, broadly, by a difference in the degree of extension of the fibers of the mulsh on the upper and lower faces thereof, which extension is caused by the application of moisture. The regulation of the sizes of the planting openings, will, in addition to maintaining the soil in the proper condition, exclude the weed seeds which are deposited on the mulshes after the formation of the planting openings therein.

The method of forming the mulsh consists in subjecting a piece of fibrous material, preferably paper, to the action of a waterproofing material, which may be asphalt, tar, creosote, oil, or a mixture of any two or more of these substances, or any other suitable water-proofing material. The fibrous material which may be in any convenient form, but which I have illustrated and later described, as in the form of a strip, is impregnated with the water-proofing material to a point of undersaturation. If the strip of material were completely saturated with the water-proofing substance, it would, of course, be impervious to moisture, but by incompletely saturating the strip, the fibers thereof will be free to take up a certain amount of moisture, and yet the strip will be water-proof to the extent that it will prevent the free passage of water therethrough. The difference in the bursting strength, as measured by such devices as the Mullen or Ashcroft paper testers, of the impregnated material when dry and the same impregnated material after immersion in water, will indicate the moisture absorbing qualities.

Figure 1:
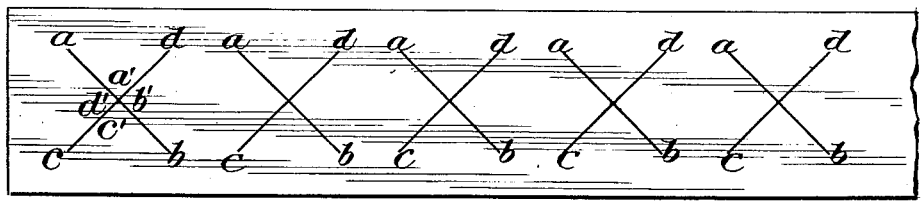
Figure 1 is a plan view of a portion of a mulsh showing the incisions therein and showing the resulting flaps as lying flat, or substantially in the plane of the body of the mulsh.
Figure 2:
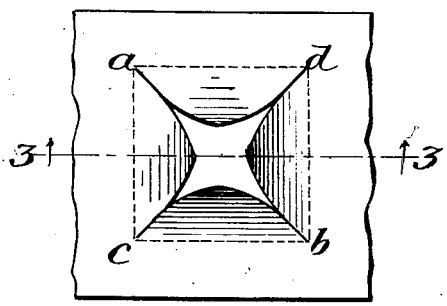
Fig. 2 is a fragmental plan view showing the flaps in raised positions, due to the application of moisture to the under surface of the mulsh.

After the strip has been suitably impregnated with water-proofing material, it is placed upon the ground in surface contact therewith over the locations where the plant seeds or stock are to be subsequently set. This mulsh is permitted to remain in place on the ground until the weed seeds have germinated and the resulting weeds have been exterminated as described in my copending application Serial No. 325,721, filed September 23, 1919. When a sufficient period has elapsed to insure the extermination of all of the weeds, the planting openings are formed by the incising of the strip to produce flaps. For instance, in Fig. 1, the incisions a—b and c—d are made. These incisions extend substantially at right angles to each other and produce flaps a', b', c' and d' which are bendable along the basal lines indicated in dotted lines in Fig. 2 of the drawing in a manner which will later appear. As in the above referred to application, the plant seeds or the plant stock are set in the resulting planting openings, and the plants permitted to force their way between the flaps and particularly at the point where the apices of the flaps meet.

Figure 3:
Fig. 3 is a fragmental sectional view on line 3—3 of Fig. 2.

During dry periods the soil beneath the mulsh will contain more moisture than the air and consequently the lower surface of the mulsh will be comparatively moist while the upper surface thereof will be dry. The moistening of the fibers of the lower surfaces of the flaps a', b', c' and d' will cause an extension and an expansion of these fibers and consequently will cause a lengthening of the under sides of the flaps and the raising of the same substantially into the position shown in Fig. 3, the general curvature extending from the basal lines of the flaps to the apices thereof.

During a rainy period, the fibers on or near the upper surfaces of the flaps will become more saturated with water than those on or near the lower surfaces, and consequently will expand and extend to a greater degree. This expansion and extension of the fibers of the upper surfaces will cause the lowering of the flaps and the flaps will again lie in substantially the plane of the body of the mulsh with the edges thereof practically in contact with each other. Thus the over saturation of the soil by the rain waters will be prevented as the water will be largely excluded from the planting openings. Of course, a certain amount of water passes through the incisions, but this is beneficial rather than detrimental, as it supplies the soil with sufficient moisture to insure the proper growing of the plants. Then again, the lowering of the flaps closes the planting openings so that the weed seeds which have blown and have been deposited on the mulshes, and which are washed about by the rain water, are excluded from the planting openings. It will be realized that after the plants have made their appearance, the flaps cannot return to their initial position, but the ends thereof will be up-turned by contact with the stems of the plants.

Thus, it will be seen that during a dry period the flaps will rise and will expose the soil of the planting areas to the action of the air and sun, so that the soil will be properly aerated, but during the rainy period the flaps will be lowered and the excess moisture excluded.

Figure 5:
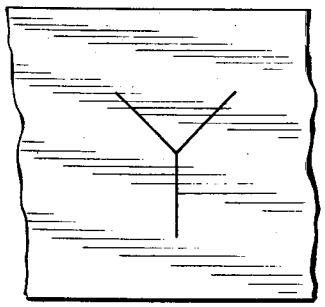
Fig. 5 is a fragmental view showing a second modification.
Figure 4:
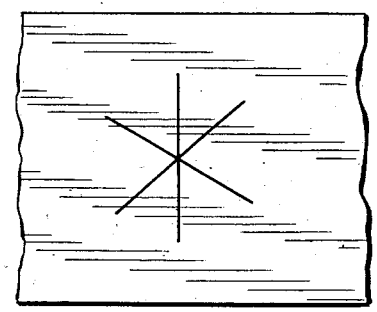
Fig. 4 is a fragmental view of a modification.

In Figs. 4 and 5 of the drawing, I have illustrated different manners in which the process may be carried out, in that various flaps are produced. These flaps may either be increased or decreased at the will of the operator, and while I have described the production of the flaps after the mulsh has been placed on the ground, at which time the incisions should be made when the mush is dry, it is to be understood that the incisions may be made before the application of the mulsh to the ground, if this is found desirable.

The mulsh resulting from the process above described, consists of a strip or sheet of fibrous material, such as paper, which is under-saturated with a water-proofing substance so that the fibers of the paper will be affected by moisture to cause their expansion and extension. The mulsh comprises flaps which produce planting openings and which are adapted to rise and to be lowered by the expansion and extension of the fibers, due to the application of moisture.

What I claim is:

1. The method of making a mulsh which consists in incompletely saturating a piece of fibrous material with a water-proofing substance and incising the same to form flaps.

2. The method of making a mulsh which consists in incompletely saturating a piece of fibrous material with a water-proofing substance, and incising the same to form substantially triangular flaps.

3. The method of making a mulsh which consists of incompletely saturating a piece of fibrous material with a water-proofing substance and in forming at least one flap therein which is adapted to rise to produce an opening.

4. The method of making a mulsh which consists in incompletely saturating a piece of fibrous material with a water-proofing substance and in forming opposed flaps therein which are adapted to rise to produce an opening.

5. The method of making a mulsh which consists in incompletely saturating a piece of fibrous material with a water-proofing substance and in producing intersecting slits therein whereby substantially triangular flaps are formed.

6. A mulsh consisting of a piece of fibrous material incompletely saturated with a water-proofing substance and having flaps therein adapted to rise to produce a planting opening.

7. A mulsh consisting of a strip of paper incompletely saturated with a water-proofing substance and having at least one flap therein to produce a planting opening.

8. A mulsh consisting of a strip of paper incompletely saturated with a water-proofing substance and having opposed triangular flaps therein to produce a planting opening.

9. A mulsh with auto-regulating openings.

10. A mulsh having a varying opening therein which is controlled by at least one auto-regulatory flap.

11. A mulsh with an opening therein and with at least one auto-regulatory flap attached to the body of the mulsh as means for controlling the areas of said opening as related to the plane of the mulsh.

In testimony whereof I affix my signature, in presence of two witnesses.

CHARLES F. ECKART.

Witnesses:
 ALLAN M. BOYLE,
 T. W. CALDER.